(12) United States Patent
Dragan

(10) Patent No.: US 11,192,503 B2
(45) Date of Patent: Dec. 7, 2021

(54) INTEGRATED GRAVITATIONAL ANTI-SPILL CONTAINER SYSTEM

(71) Applicant: Toyota Motor Engineering & Manufacturing North America, Inc., Plano, TX (US)

(72) Inventor: Christopher E. Dragan, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/505,465

(22) Filed: Jul. 8, 2019

(65) Prior Publication Data

US 2021/0009043 A1    Jan. 14, 2021

(51) Int. Cl.
| | | |
|---|---|---|
| *B60R 9/08* | (2006.01) | |
| *B60R 9/045* | (2006.01) | |
| *B60R 7/08* | (2006.01) | |
| *B60R 7/04* | (2006.01) | |

(52) U.S. Cl.
CPC . *B60R 7/08* (2013.01); *B60R 7/04* (2013.01)

(58) Field of Classification Search
CPC .... B60R 7/02; B60R 7/08; B60R 7/10; B60R 2011/0082; B60R 2011/0087; B60R 2011/0089; B60R 11/02; B60R 2011/0059; B60R 2011/0017; B60R 2011/0071; Y10S 224/925; Y10S 224/926; Y10S 224/927; A47G 25/0607; B60N 2002/905

USPC ............... 224/449, 458, 560, 925–926, 544; 248/215, 322, 339, 341, 304, 307

See application file for complete search history.

(56) References Cited

U.S. PATENT DOCUMENTS

| | | | | |
|---|---|---|---|---|
| 2,536,293 A | * | 1/1951 | Koses | A47G 25/08 |
| | | | | 224/482 |
| 3,228,577 A | * | 1/1966 | Croft | A47G 23/0616 |
| | | | | 224/553 |
| 3,907,118 A | * | 9/1975 | Pelavin | A47G 25/0614 |
| | | | | 211/113 |
| 4,720,028 A | * | 1/1988 | Takemura | B60R 7/10 |
| | | | | 224/313 |
| 4,943,025 A | | 7/1990 | Warner | |
| 5,029,793 A | * | 7/1991 | Warner | B60N 3/103 |
| | | | | 248/318 |
| 5,287,971 A | | 2/1994 | Dorman | |
| 5,366,189 A | | 11/1994 | Thompson | |
| 6,092,704 A | * | 7/2000 | Baumeister | B60R 5/04 |
| | | | | 224/275 |
| 6,158,793 A | * | 12/2000 | Castro | B60R 11/02 |
| | | | | 224/548 |

(Continued)

FOREIGN PATENT DOCUMENTS

| | | |
|---|---|---|
| FR | 2794624 | 6/1999 |
| FR | 2886243 | 5/2005 |
| GB | 2427855 | 1/2007 |

*Primary Examiner* — Adam J Waggenspack
(74) *Attorney, Agent, or Firm* — Snell & Wilmer LLP

(57) ABSTRACT

Systems and apparatus for preventing spilling of a container inside a vehicle. The system includes an arm connected to a device or surface within the vehicle. The system also includes an engagement device connected to the arm and configured to engage a carrying device holding the container, the arm having a length such that the carrying device is suspended and avoids contact with any object inside of the vehicle.

14 Claims, 7 Drawing Sheets

(56) References Cited

U.S. PATENT DOCUMENTS

| | | | |
|---|---|---|---|
| 6,381,133 B1* | 4/2002 | Chen | B60R 11/0252 |
| | | | 248/918 |
| 6,422,524 B1* | 7/2002 | Spagnuolo | B60R 7/10 |
| | | | 248/307 |
| 6,669,067 B2 | 12/2003 | Schuster | |
| 6,789,773 B2* | 9/2004 | Holland | A47G 25/0607 |
| | | | 248/307 |
| 6,811,196 B2 | 11/2004 | Gammon | |
| 6,908,269 B1 | 6/2005 | Young et al. | |
| 6,923,356 B2* | 8/2005 | Reynolds | A45F 3/14 |
| | | | 224/254 |
| 7,516,929 B2* | 4/2009 | Brustein | A47G 29/083 |
| | | | 248/304 |
| 7,644,972 B2* | 1/2010 | Lim | B60R 11/00 |
| | | | 296/37.1 |
| 7,766,290 B1* | 8/2010 | Bradbury | A47J 45/02 |
| | | | 248/200.1 |
| 7,942,296 B1* | 5/2011 | Johnson | A45C 7/0086 |
| | | | 224/578 |
| 8,215,688 B2 | 7/2012 | Hipshier et al. | |
| 8,272,548 B2* | 9/2012 | Le Texier | B60R 11/0247 |
| | | | 224/570 |
| 8,307,966 B2* | 11/2012 | Cummins | A45F 5/00 |
| | | | 190/102 |
| 8,783,989 B2* | 7/2014 | Weigel | A46B 5/0033 |
| | | | 401/127 |
| 8,858,139 B2* | 10/2014 | Prottengeier | B60R 7/08 |
| | | | 410/121 |
| 9,340,143 B2* | 5/2016 | Stakoe | B60P 7/0815 |
| 9,457,732 B2* | 10/2016 | Qian | B60R 11/02 |
| 9,586,529 B1* | 3/2017 | Sanchez | B60R 7/10 |
| 9,873,381 B2* | 1/2018 | Juarez Corona | B60R 7/02 |
| 9,963,078 B1* | 5/2018 | Zimmermann | B60R 7/14 |
| 10,040,399 B1* | 8/2018 | Manzo | B60N 2/90 |
| 10,053,018 B1* | 8/2018 | Goodrow | B60R 7/10 |
| 10,065,565 B2* | 9/2018 | Mozurkewich | B60N 2/643 |
| 10,066,659 B2* | 9/2018 | Osaki | F16B 45/00 |
| 10,328,861 B2* | 6/2019 | Gasca Fuentes | B60R 7/08 |
| 2006/0283680 A1* | 12/2006 | Hollin | A45C 13/02 |
| | | | 190/110 |
| 2007/0090252 A1* | 4/2007 | Chou | A47G 25/065 |
| | | | 248/304 |
| 2007/0095989 A1 | 5/2007 | Spater et al. | |
| 2008/0169395 A1* | 7/2008 | Bullock | B60P 7/0815 |
| | | | 248/304 |
| 2012/0006870 A1* | 1/2012 | Proctor | B60R 11/02 |
| | | | 224/275 |
| 2013/0037672 A1* | 2/2013 | Sanchez | B60R 7/10 |
| | | | 248/303 |
| 2014/0355139 A1* | 12/2014 | Begay | F16M 11/10 |
| | | | 359/818 |
| 2016/0138646 A1* | 5/2016 | Elperman | F16C 11/069 |
| | | | 403/144 |

\* cited by examiner

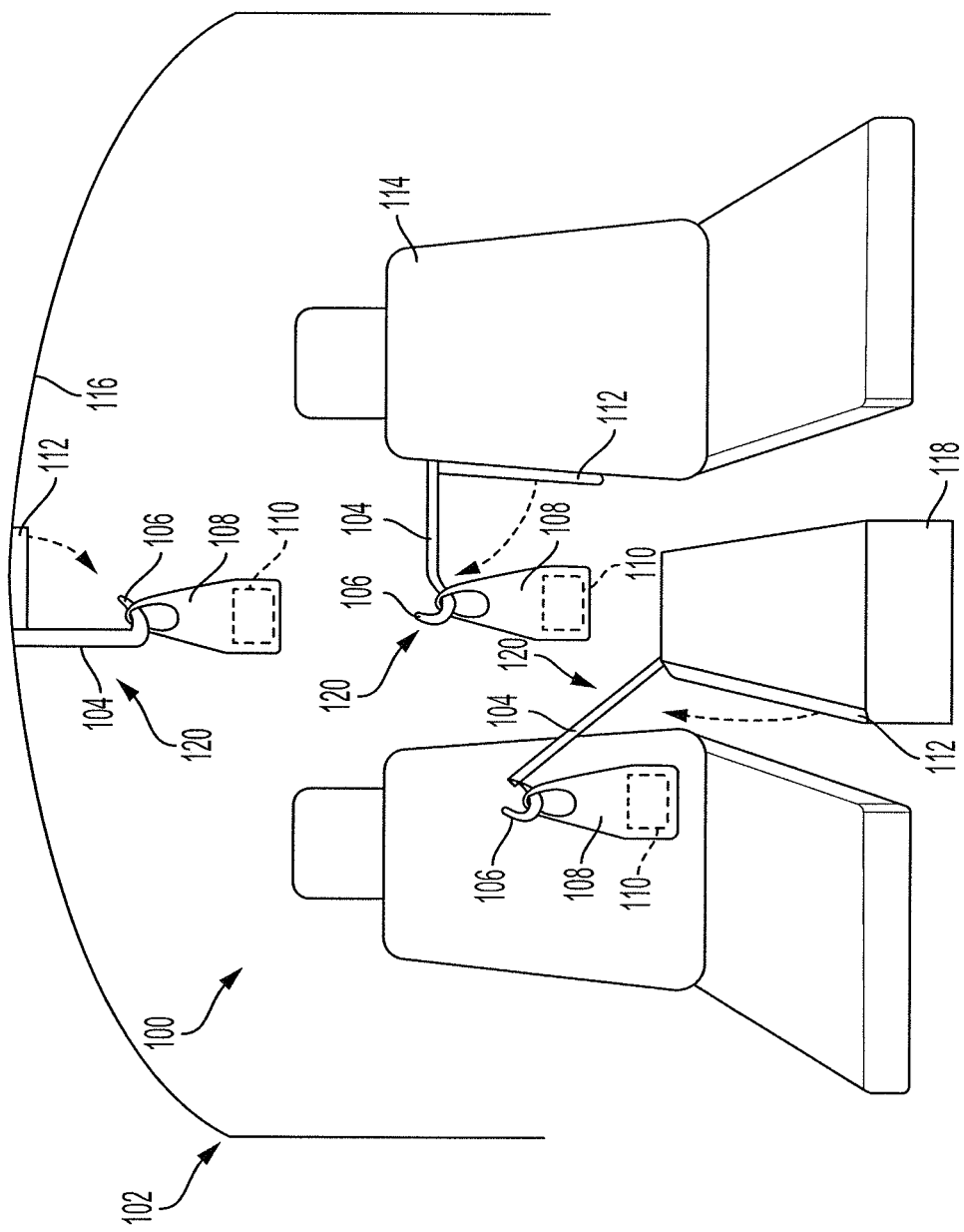

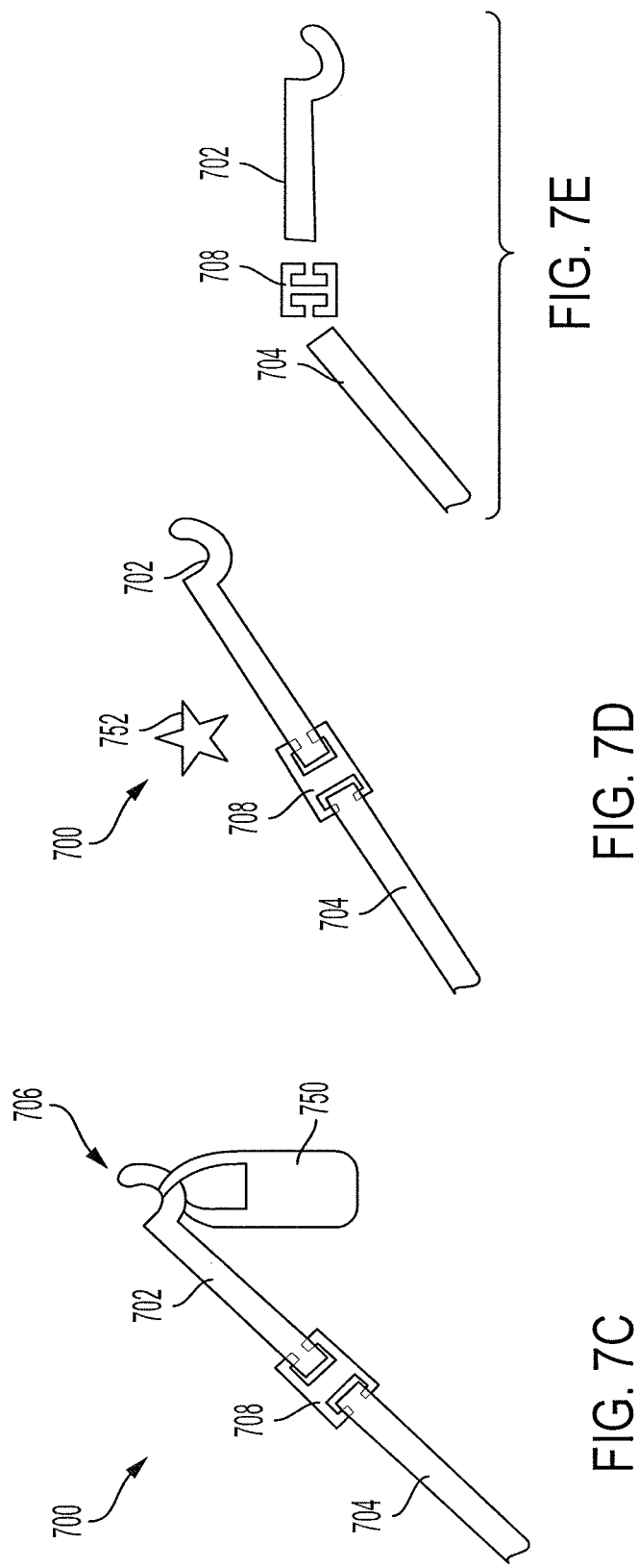

INTEGRATED GRAVITATIONAL ANTI-SPILL CONTAINER SYSTEM

BACKGROUND

1. Field

This specification relates to a system and apparatus for preventing spilling of the contents of a container in a vehicle.

2. Description of the Related Art

Many individuals transport items using their vehicles. These items may include containers of food, containers of liquid, or containers with fragile items inside. While these containers may have lids, in some situations, the lids may become dislodged when the container makes contact with an object or when the container is tipped over. For example, a paper container of food and sauce may spill if the paper container is tipped over. In another example, a grocery bag filled with produce may spill out of the bag if the bag is tipped over.

Being inside of a vehicle makes tipping over more likely, due to the roll/pitch of the vehicle when the vehicle turns or accelerates or decelerates while travelling from one location to another. For example, when a vehicle turns sharply or brakes sharply, the contents of a plastic bag may spill out of the bag, and any containers within the plastic bag may also spill. Thus, there is a need for improved storage inside of a vehicle.

SUMMARY

What is described is a system for preventing spilling of a container inside a vehicle. The system includes an arm connected to a device or surface within the vehicle. The system also includes an engagement device connected to the arm and configured to engage a carrying device holding the container, the arm having a length such that the carrying device is suspended and avoids contact with any object inside of the vehicle.

Also described is an apparatus for preventing spilling of a container inside a vehicle. The apparatus includes an arm portion connected to a device or surface within the vehicle. The apparatus also includes an engagement portion connected to the arm portion and configured to engage a carrying device holding the container, the arm portion having a length such that the carrying device is suspended and avoids contact with any object inside of the vehicle.

Also described is a vehicle having a container located therein. The vehicle includes a device or a surface located in an interior cabin. The vehicle also includes an arm connected to the device or the surface. The vehicle also includes an engagement device connected to the arm and configured to engage a carrying device holding the container, the arm having a length such that the carrying device is suspended within the interior cabin and avoids contact with any object inside the interior cabin.

BRIEF DESCRIPTION OF THE DRAWINGS

Other systems, methods, apparatus, features, and advantages of the present invention will be apparent to one skilled in the art upon examination of the following figures and detailed description. Component parts shown in the drawings are not necessarily to scale, and may be exaggerated to better illustrate the important features of the present invention.

FIG. 1 illustrates a vehicle having an integrated gravitational anti-spill container system, according to various embodiments of the invention.

FIGS. 7A-7E illustrate an integrated gravitational anti-spill container system with a breakaway arm, according to various embodiments of the invention.

DETAILED DESCRIPTION

Figure 2A:
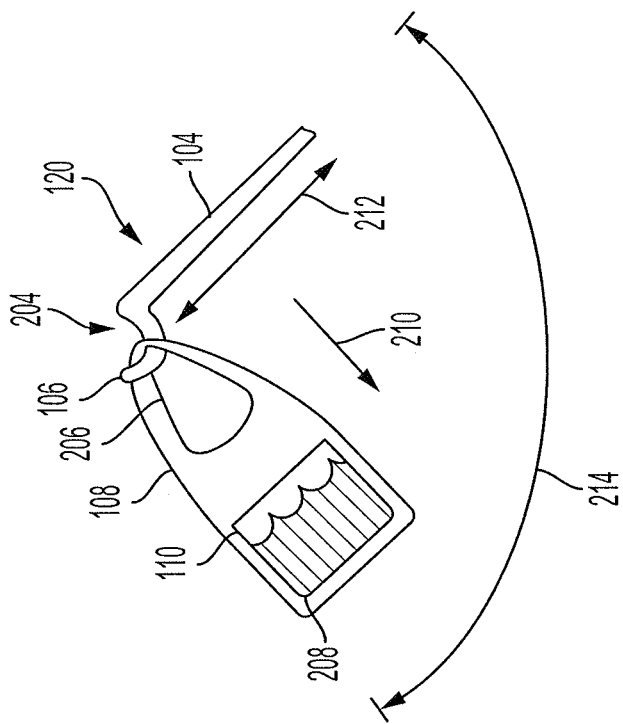
FIGS. 2A-2B illustrate use of the integrated gravitational anti-spill container system, according to various embodiments of the invention.

Disclosed herein are systems and apparatus for preventing spilling of a container inside a vehicle. Conventionally, individuals may place a bag on the floor of the inside of the vehicle, in a trunk of the vehicle, or on a seat of the vehicle. However, when the vehicle makes turns or accelerates or decelerates, the bag may tip over and the contents of the bag may spill. In some situations, the bag may remain in the same position, but a container within the bag may tip over and spill. For example, a plastic bag containing a plastic container of chili may be on a floor of a vehicle. The vehicle may turn, and the plastic container within the plastic bag may tip over, and the chili may spill within the bag. The interior of the vehicle may be affected if the plastic bag has any holes. Even if the plastic bag prevents leaks of the chili from contacting the interior of the vehicle, the chili is likely no longer fit for consumption.

Some vehicles may have hooks inside the vehicle attached to the headrest of a vehicle seat, but hooks may not prevent the internal spilling of containers within the plastic bag, as there is no mechanism to ensure the container within the plastic bag remains in a non-spilling orientation. In addition, these hooks are not retractable and protrude from the vehicle seat at all times.

The system described herein includes a stowable arm connected to a device or surface within the vehicle. The system also includes an engagement device connected to the arm and configured to engage a carrying device (e.g., plastic bag) holding the container, the arm having a length such that the carrying device is suspended and avoids contact with any object inside of the vehicle. Due to the carrying device being suspended, the container remains in a non-spilling orientation at all times.

FIG. 1 illustrates a view of the interior of a vehicle 102, which includes a passenger cabin 100. Inside of the passenger cabin 100 are various devices and surface of the vehicle 102, including a seat 114, a center console 118, and a ceiling 116, for example.

Attached to these various devices and surfaces of the vehicle 102 is the integrated gravitational anti-spill container system 120. The integrated gravitational anti-spill container system 120 includes an arm 104 and an engagement device 106. The arm 104 is attached to the various devices and surfaces of the vehicle 102, the arm 104 is attached to the engagement device 106, and the engagement device 106 is configured to receive and hold a carrying device 108 carrying a container 110. Thus, the container 110 is suspended within the passenger cabin 100 via the arm 104 and the engagement device 106.

The arm 104 is spaced apart from other objects within the passenger cabin 100 of the vehicle 102 such that when the carrying device 108 swings, the carrying device 108 and the container 110 do not contact any other objects. If the carrying device 108 and the container 110 were to contact an object, the contents of the container 110 may spill.

The carrying device 108 is configured to hold the container 110, and may be a plastic bag or a canvas bag, for example. The container 110 is configured to hold any object which the driver or occupant of the vehicle 102 would prefer to keep within the container 110 (e.g., food, liquid, or fragile items).

The arm 104 is configured to be in a deployed position or a stowed position. The arm 104 may move from the stowed position to the deployed position, as illustrated in FIG. 1 by the dashed line. When the arm 104 moves from the deployed position to the stowed position, the arm 104 may move outward. That is, the arm 104 may move toward the center of the passenger cabin 100. For example, the arm 104 connected to the center console 118 moves upward, and the arm 104 connected to the ceiling 116 moves downward. The stowed position allows the integrated gravitational anti-spill container system to be out of the way when not being used.

When the arm 104 is in the stowed position, the arm 104 may be located within a slot (or housing) 112. The slot 112 may prevent the arm 104 or the engagement device 106 from interfering with passenger enjoyment of the vehicle 102 when the integrated gravitational anti-spill container system 120 is not in use.

While there are multiple integrated gravitational anti-spill container systems 120 (e.g., one attached to a seat 114, one attached to a center console 118, and one attached to the ceiling 116), some vehicles may have only one integrated gravitational anti-spill container system 120 in the passenger cabin 100. In addition, the locations shown in FIG. 1 are not the only locations where the integrated gravitational anti-spill container system 120 may be located. The integrated gravitational anti-spill container system 120 may also be located at a passenger's side seat, second row of seats, third row of seats, door trim, instrument panel, pillars, or trunk, for example. While the passenger cabin 100 is shown in FIG. 1, the integrated gravitational anti-spill container system 120 may be used in a trunk, a trailer, or any other space associated with the vehicle 102.

FIG. 2A illustrates the integrated gravitational anti-spill container system 120 holding a carrying device 108 having a container 110 located within. As shown in FIG. 2A, the container 110 is storing a liquid 208. The carrying device 108 has an engagement portion 206 (e.g., a handle) that couples with the engagement device 106. The engagement device 106 includes a receiving portion 204 configured to couple with the carrying device 108. More specifically, the receiving portion 204 of the engagement device 106 couples with the engagement portion 206 of the carrying device 108.

The arm 104 has a length 212 that is sufficient to ensure the carrying device 108 and the container 110 do not contact any object within the vehicle, to reduce the risk of the contents of the container 110 spilling or being damaged.

The length 212 of the arm 104 may vary based on the location of the integrated gravitational anti-spill container system 120 within the vehicle and may be tuned for each vehicle. In addition, the arm 104 may be extendable to accommodate for varying sizes of carrying devices 108. That is, the length 212 may be adjustable to be increased or decreased. The arm 104 may have a telescoping body with securing mechanisms (e.g., pins or clamps) to allow for the extendibility of the arm 104.

As shown in FIG. 2A, when the carrying device 108 is coupled with the engagement device 106 and the vehicle is not moving, the liquid 208 in the container 110 will not spill, as gravitational force 202 ensures the liquid 208 is forced against the bottom surface of the container 110.

Figure 2B:
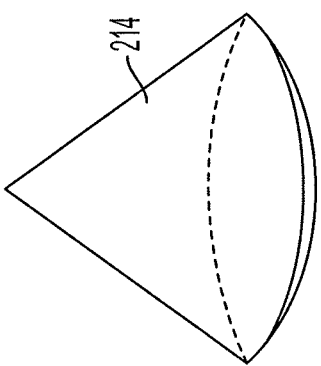
Figure 2C:
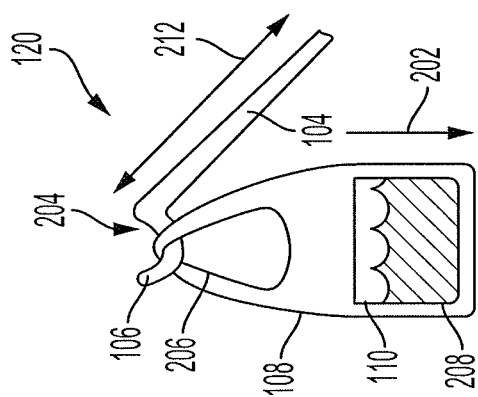
FIGS. 2C-2D illustrate the range of motion of a carrying device attached to the integrated gravitational anti-spill container system, according to various embodiments of the invention.
Figure 2D:
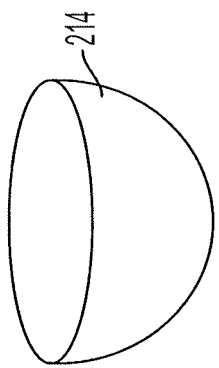

As shown in FIG. 2B, when the carrying device 108 is coupled with the engagement device 106 and the vehicle is moving (e.g., making a turn), the liquid 208 in the container 110 will still not spill, as centrifugal force 210 ensures the liquid 208 is forced against the bottom surface of the container 110. The centrifugal force 210 is allowed to ensure the liquid 208 does not spill because the container 110 is suspended in the air by the integrated gravitational anti-spill container system 120. The carrying device 108 and the container 110 can swing in a range of freedom 214 in three dimensions without the liquid 208 spilling from the container 110. The range of freedom 214 may be at least 90 degrees in three dimensions, which, put differently, is a spherical cone (or spherical sector) having a cross-sectional cone angle of 90 degrees, illustrated in FIG. 2C. In some embodiments, the range of freedom 214 is at least 180 degrees in three dimensions, which, put differently, is half of a sphere in shape, illustrated in FIG. 2D.

The container 110 may be freely located within the carrying device 108. For example, the container 110 may simply be placed within the carrying device 108. The container 110 may be removably attached to the carrying device 108. For example, the carrying device 108 may have a receiving portion and a securing mechanism to secure the container 110 to the carrying device 108. The container 110 may be fixedly attached to the carrying device 108. For example, the carrying device 108 may be a strap that is attached to the container 110, and the strap may be the engagement portion 206 of the carrying device 108 described herein.

Figure 3A:
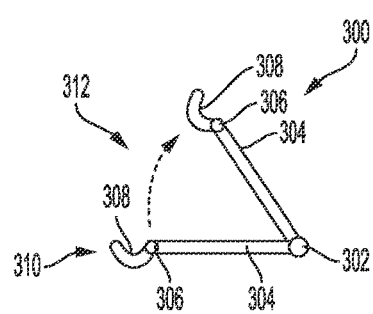
FIGS. 3A-3C illustrate various shapes of the arm of the integrated gravitational anti-spill container system, according to various embodiments of the invention.

FIG. 3A illustrates an integrated gravitational anti-spill container system 300 having an arm 304 and an engagement device 308 as described herein. The arm 304 pivots about a pivot point 302. The arm 304 moves from a stowed position 310 to a deployed position 312, as shown by the dashed line. When the arm 304 moves from the stowed position 310 to the deployed position 312, the arm 304 may pivot outward in a direction such that when the carrying device 108 is coupled with the engagement device 308, the container 110 within the carrying device 108 is suspended in the vehicle. The integrated gravitational anti-spill container system may have a mechanism to secure the arm 304 in the deployed position 312. In some embodiments, the mechanism is a pin or other securing mechanism. In some embodiments, the mechanism is a hydraulic cylinder.

The integrated gravitational anti-spill container system 300 may also include a pivot point 306 located between the engagement device 308 and the arm 304. The pivot point 306 may allow the engagement device 308 to pivot to ensure the engagement device 308 is in an orientation to receive the carrying device 108. The pivot point 306 may be spring-loaded such that a spring urges the engagement device 308 to be substantially straight relative to the arm 304 until the carrying device 108 is received by the engagement device 308. When the carrying device 108 is coupled to the engagement device 308, the weight of the carrying device 108 and the container 110 therein may overcome the spring force of the spring of the pivot point 306, and the engagement device 308 may be substantially horizontal, as shown in FIG. 3A.

Figure 3B:
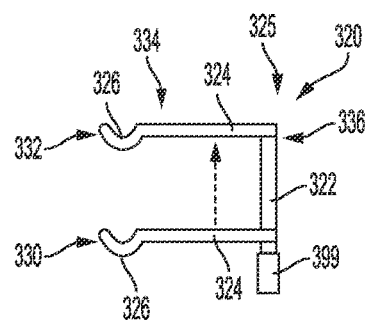

FIG. 3B illustrates an integrated gravitational anti-spill container system 320 having an arm 325 and an engagement device 326 as described herein. The arm 325 includes a first portion 324 that is substantially horizontal in orientation and a second portion 322 that is substantially vertical in orientation. The first portion 324 has a first end 334 that is connected to the engagement device 326 and a second end 336 that is connected to the second portion 322. The arm 325 moves from a stowed position 330 to a deployed position 332, as shown by the dashed line. When the arm 325 moves from the stowed position 330 to the deployed position 332, the second portion 322 moves the first portion 324 outward in a direction such that when the carrying device 108 is coupled with the engagement device 326, the container 110 within the carrying device 108 is suspended in the vehicle.

As compared to the integrated gravitational anti-spill container system 300, the integrated gravitational anti-spill container system 320 provides more clearance for the carrying device 108 to move without making contact with an object (e.g., arm 304).

In some embodiments, the second portion 322 is fixed in length and slides vertically relative to a channel or sleeve 399 and is secured in place using a securing mechanism (e.g., a collar or clamp or pin). In some embodiments, the second portion 322 can vary in length. The second portion 322 may have a telescoping body with securing mechanisms (e.g., pins or clamps) to allow for the vertical extendibility of the second portion 322.

The integrated gravitational anti-spill container system 320 may have a mechanism to secure the arm 325 in the deployed position 332. In some embodiments, the mechanism is a pin or other securing mechanism. In some embodiments, the mechanism is a hydraulic cylinder.

Figure 3C:
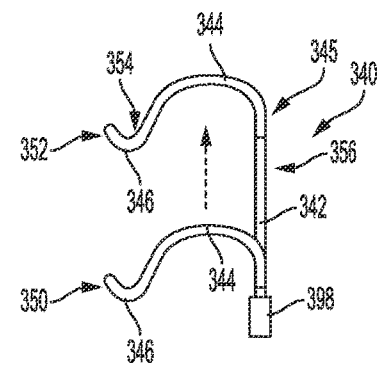

FIG. 3C illustrates an integrated gravitational anti-spill container system 340 having an arm 345 and an engagement device 346 as described herein. The arm 345 includes a first portion 344 that is substantially curved in shape and a second portion 342 that is substantially vertical in orientation. The first portion 344 is curved in an upward direction toward the ceiling of the interior of the vehicle. The first portion 344 has a first end 354 that is connected to the engagement device 346 and a second end 356 that is connected to the second portion 342. The arm 345 moves from a stowed position 350 to a deployed position 352, as shown by the dashed line. When the arm 345 moves from the stowed position 350 to the deployed position 352, the second portion 342 moves the first portion 344 outward in a direction such that when the carrying device 108 is coupled with the engagement device 346, the container 110 within the carrying device 108 is suspended in the vehicle.

As compared to the integrated gravitational anti-spill container system 300 and the integrated gravitational anti-spill container system 320, the integrated gravitational anti-spill container system 320 provides more clearance for the carrying device 108 to move without making contact with an object (e.g., arm 304, arm 345).

In some embodiments, the second portion 342 is fixed in length and slides vertically relative to a channel or sleeve 398 and is secured in place using a securing mechanism (e.g., a collar or clamp or pin). In some embodiments, the second portion 342 can vary in length. The second portion 342 may have a telescoping body with securing mechanisms (e.g., pins or clamps) to allow for the vertical extendibility of the second portion 342.

The integrated gravitational anti-spill container system 320 may have a mechanism to secure the arm 345 in the deployed position 352. In some embodiments, the mechanism is a pin or other securing mechanism. In some embodiments, the mechanism is a hydraulic cylinder.

Figure 4A:
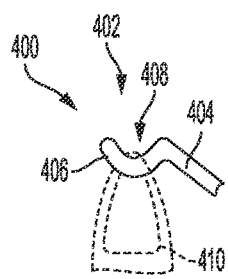
FIGS. 4A-4C illustrate various types of engagement devices of the integrated gravitational anti-spill container system, according to various embodiments of the invention.

FIG. 4A illustrates an engagement device 400. The engagement device 400 has a tip end 406, a base end 404 and a receiving portion 408. The base end 404 of the engagement device 400 is connected to the arm (e.g., arm 304, 325, 345). The engagement device 400 is open to receiving the carrying device 410 (e.g., carrying device 108). The carrying device 410 passes over the tip end 406 of the engagement device via an opening 402 and is received by the receiving portion 408. While the tip end 406 is illustrated as having a round termination, in other embodiments, the tip end 406 may terminate in a flat shape, a pointed shape, an oval shape, or any other shape.

Figure 4B:
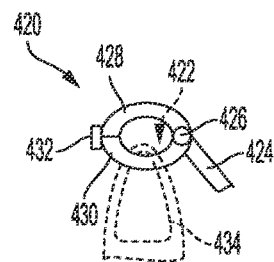

FIG. 4B illustrates an engagement device 420 in a closed state. The engagement device 420 has a base portion 430, a top portion 428 and a clasp 432. In the closed state, the engagement device 420 engages the carrying device 434 (e.g., carrying device 108) within an opening 422 between the top portion 428 and the base portion 430. The engagement device 420 also has a base end 424 connected to the arm (e.g., arm 304, 325, 345). The clasp 432 may hold the top portion 428 and the base portion 430 together so that the carrying device 434 does not become disengaged from the engagement device 420. The engagement device 420 may move from a closed state to an open state by unsecuring the clasp 432 and rotating the top portion 428 about a hinge 426.

Figure 4C:
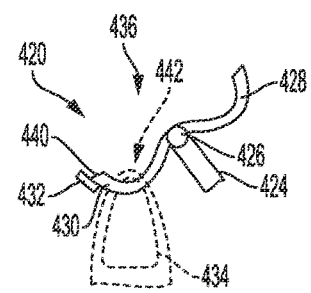

FIG. 4C illustrates the engagement device 420 in the open state. The engagement device 420 is open and able to receive the carrying device 434. The carrying device 434 passes over the tip end 440 of the base portion 430 of the engagement device 420 via an opening 436 and is received by the receiving portion 442. While the tip end 440 is illustrated as having a flat termination, in other embodiments, the tip end 440 may terminate in a pointed shape, a circular shape, an oval shape, or any other shape that has a complementary shape on the top portion 428.

Figure 5B:
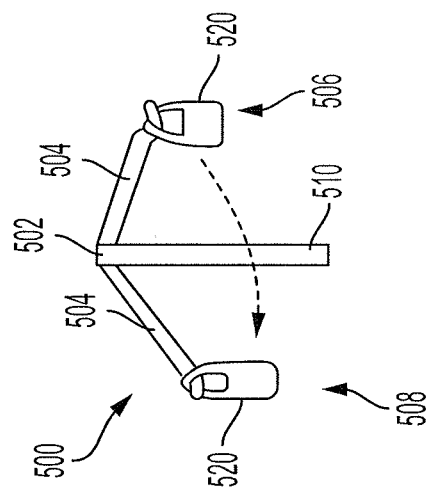
FIGS. 5A-5B illustrate the arm of the integrated gravitational anti-spill container system pivoting horizontally, according to various embodiments of the invention.
Figure 5A:
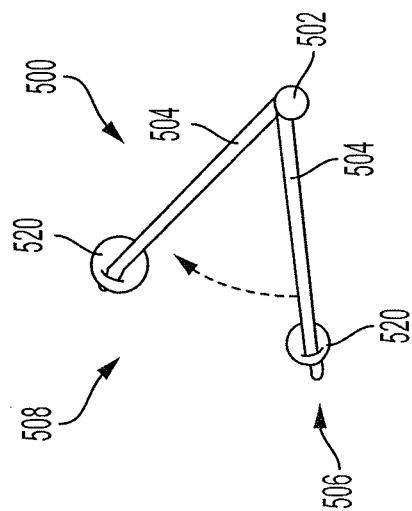

FIG. 5A illustrates a top-down view of an integrated gravitational anti-spill container system 500. The integrated gravitational anti-spill container system 500 can move from a first position 506 to a second position 508. The arm 504 of the integrated gravitational anti-spill container system 500 pivots about an axis 502 to move from the first position 506 to the second position 508. The integrated gravitational anti-spill container system 500 may be pivoted to the side to move the carrying device 520 to the side to avoid the carrying device 520 from making contact with an object in the vehicle. The positioning of the arm may be secured using a securing device, such as a pin or collar or clamp.

FIG. 5B illustrates a side view of the integrated gravitational anti-spill container system 500 of FIG. 5A. The integrated gravitational anti-spill container system 500 can move from the first position 506 to the second position 508. The arm 504 of the integrated gravitational anti-spill container system 500 pivots about the axis 502 of a base portion 510 of the arm 504 to move from the first position 506 to the second position 508.

Figure 6:
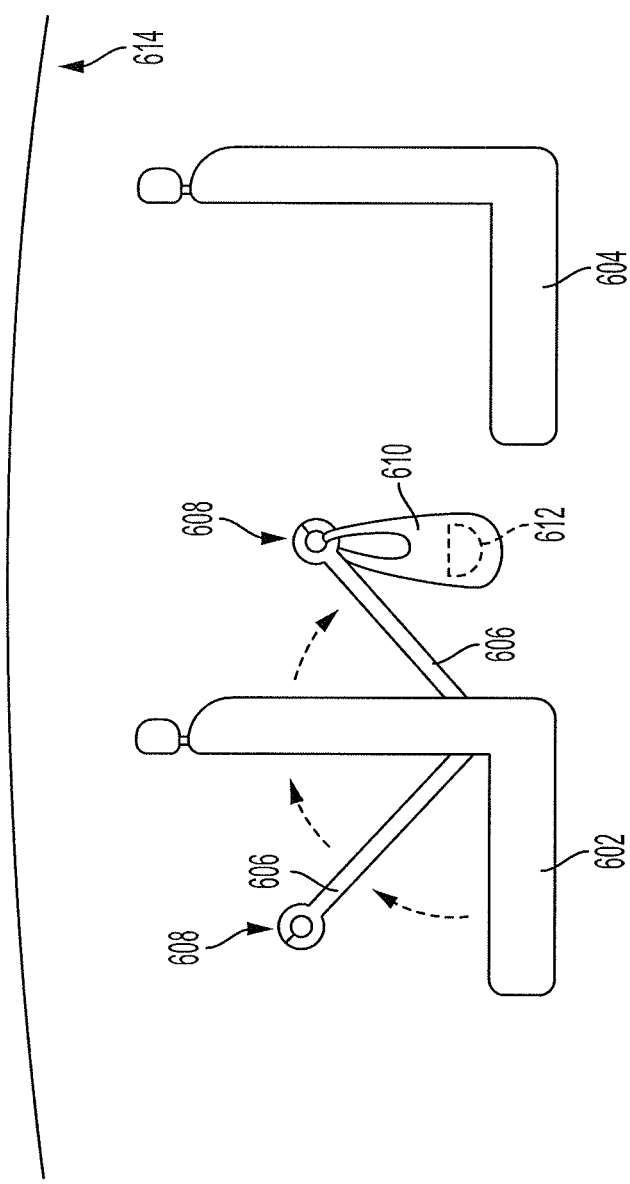
FIG. 6 illustrates an arm capable of pivoting from a first row of seats to a second row of seats, according to various embodiments of the invention.
Figure 7B:
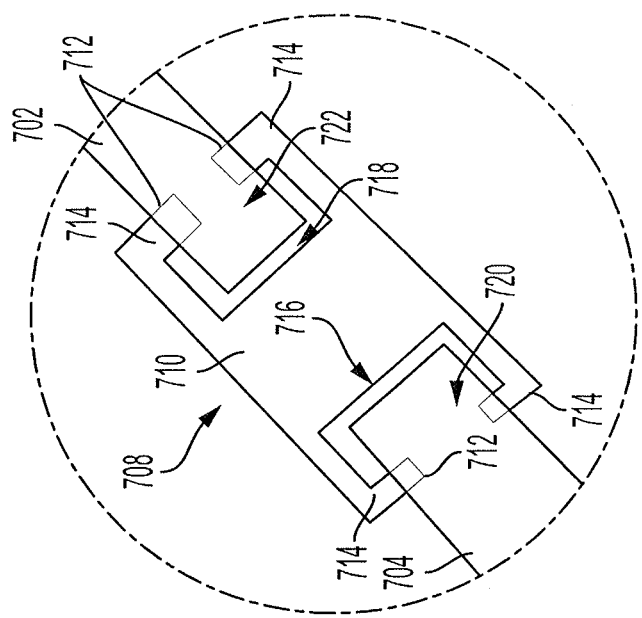
Figure 7A:
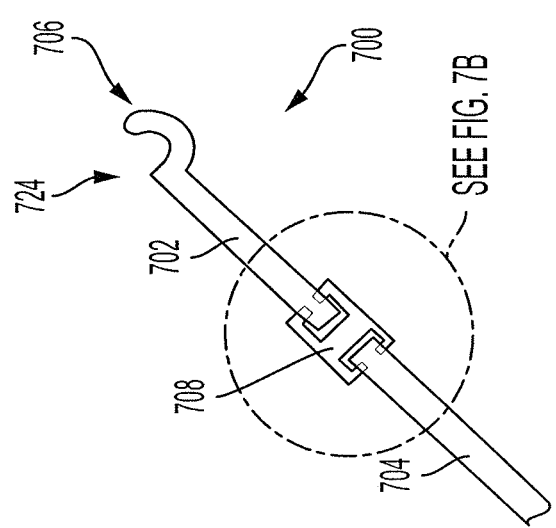

FIG. 6 illustrates an arm of the integrated gravitational anti-spill container system pivoting to a second row of seats.

An integrated gravitational anti-spill container system having an arm 606 and an engagement device 608 may be accessible to a first row of seats 602. In addition, the arm 606 may pivot backwards behind the first row of seats 602. When the arm 606 is pivoted to be behind the first row of seats 602, the integrated gravitational anti-spill container system may be useful to users in the second row of seats 604. The engagement device 608 is shown engaging a carrying device 610 that holds a container 612.

In addition to being accessible to the second row of seats 604, when the arm 606 is pivoted to be behind the first row of seats 602, the carrying device 610 may be out of the way of the occupants of the first row of seats 602.

FIGS. 7A-7E illustrate side cross-sectional views of an integrated gravitational anti-spill container system with a breakaway arm. The integrated gravitational anti-spill container system has an arm 700 with a first portion 702 and a second portion 704. The first portion 702 and the second portion 704 are connected by a connector 708.

The first portion 702 has a first end 724 and a second end 722. The first end 724 is attached to the engagement device 706. The second end 722 is received by the connector 708. The second portion 704 has an end 720 that is received by the connector 708.

The connector 708 has a body 710 and a first cavity 718 and a second cavity 716 on opposite ends and connected to the body 710. The first cavity 718 is configured to receive the second end 722 of the first portion 702 and the second cavity 716 is configured to receive the end 720 of the second portion 704.

The connector 708 may also have a protrusion 714 that engages a groove or channel 712 of the first portion 702 or the second portion 704. That is, the protrusion 714 of the connector 708 within the first cavity 718 engages a groove or channel 712 located on an outer perimeter of the second end 722 of the first portion 702. Similarly, the protrusion 714 of the connector 708 within the second cavity 716 engages a groove or channel 712 located on an outer perimeter of the end 720 of the second portion 704. The protrusion 714 and the groove or channel 712 maintain the connection between the second portion 704, the connector 708, and the first portion 702.

The connector 708 may be made of any rigid material capable of temporary deformation, such as a resin or plastic. The protrusion 714 may surround the inner circumference of the cavity in which it is located such that the protrusion 714 is annular in shape. Similarly, the groove or channel 712 may surround the perimeter of the portion on which it is located such that it is annular in shape. The protrusion 714 may be multiple discrete points of attachment and the groove or channel 712 may be corresponding multiple discrete points of reception of the protrusions.

In some embodiments, instead of the illustrated groove or channel and protrusion, the connector 708 maintains connection with the second portion 704 and the first portion 702 in other ways, such as an adhesive or via interference fit, for example.

Importantly, the connector 708 connects to the second portion 704 and the first portion 702 in a removable manner. That is, the connector 708 is configured to disengage from the second portion 704 and the first portion 702. The disengagement of the second portion 704 from the first portion 702 may prevent injury to an occupant when the occupant or an object strikes the arm 700 in unforeseeable situations, such as a vehicle collision.

However, the connection between the connector 708 and the second portion 704 and the connection between the connector 708 and the first portion 702 must be sufficiently strong to withstand the force exerted onto the arm by an engaged carrying device 750, as shown in FIG. 7C.

FIGS. 7D and 7E illustrate the disengagement of the connector 708 from the second portion 704 and/or the first portion 702 when a force 752 is applied to the arm 700. The force 752 may be applied to the first portion 702 or the second portion 704 in a direction that is perpendicular (or in a direction containing a perpendicular component vector) to the body of the first portion 702 or the body of the second portion 704. When the force 752 exceeds a threshold disengagement force, the first portion 702 and/or the second portion 704 disengage from the connector 708. In some situations, the first portion 702 remains in connection with the connector 708, and the connector 708 is disengaged with the second portion 704. In some situations, the second portion 704 remains in connection with the connector 708, and the connector 708 is disengaged with the first portion 702. In some situations, the first portion 702, the connector 708, and the second portion 704 all disengage from each other, as shown in FIG. 7E.

While FIGS. 7A-7E show the second portion 704 as being at least as long as the first portion 702, in some embodiments, the second portion 704 may only be sufficiently long to be reliably engaged by the connector 708. In some embodiments, the second portion 704 and the connector 708 are formed integrally such that when disengagement of the arm 700 occurs, the first portion 702 disengages from the connector 708, and the second portion 704 does not disengage from the connector 708.

While FIGS. 7A-7E illustrate the connector 708 in use with an arm 700 similar to arm 304 of FIG. 3A, the connector may be used on any arms or portions thereof described herein. For example, a connector similar to connector 708 may be located on the first portion 324 and/or the second portion 322 of the arm 325, or may be located on the first portion 344 and/or the second portion 342 of the arm 345.

The systems and devices described herein may be used in any conveyance, such as a vehicle with an internal combustion engine, a vehicle with a motor powered by a battery, a hybrid vehicle having both an engine and a motor, a fully autonomous vehicle, a semi-autonomous vehicle, or a human-driven vehicle, for example.

As used herein, approximately or substantially may be used with a plus or minus 10% margin. For example, a measurement that is approximately 5 feet may be between 4.5 feet and 5.5 feet.

The integrated gravitational anti-spill container system described herein may be made of any rigid material, such as plastic or metal. In some embodiments, the arm disclosed herein may bend or otherwise be malleable such that the user of the integrated gravitational anti-spill container system may shape the arm into any desired shape or orientation.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted herein are all such embodiments that reasonably fall within the scope of the advancement to the art hereby contributed, and that that scope shall not be restricted, except in light of the appended claims and their equivalents.

What is claimed is:

1. A system for preventing spilling of a container inside a vehicle, the system comprising:
   an arm connected to a device or surface within the vehicle at an arm hinge and configured to rotate about the arm hinge to move between a first deployed position, a second deployed position, and a stowed position; and
   an engagement device connected to the arm, having a base portion and a top portion pivotably connected by an engagement device hinge, and configured to:
   move between an open state and a closed state, the base portion and the top portion being held together by a clasp in the closed state, the top portion having a curved shape rising upward away from the engagement device hinge and downward toward the clasp, and
   engage a carrying device holding the container when the engagement device is in the open state and when the arm is in the first deployed position or the second deployed position, the arm having a length such that the carrying device is suspended, allowed to dangle freely, and avoids contact with any object inside of the vehicle, the engagement device being in front of a first row of seats of the vehicle in the first deployed position and being behind the first row of seats in the second deployed position.

2. The system of claim 1, wherein the arm is straight.

3. The system of claim 1, wherein the engagement device receives the carrying device via an opening when the engagement device is in the open state.

4. The system of claim 1, wherein the arm comprises a first portion and a second portion connected by a connector, the connector configured to maintain connection between the first portion and the second portion when the carrying device is engaged by the engagement device and release connection between the first portion and the second portion when a force is applied to the first portion.

5. The system of claim 1, further comprising the carrying device configured to receive the container and having an engagement portion configured to couple to the engagement device.

6. An apparatus for preventing spilling of a container inside a vehicle, the apparatus comprising:
   an engagement portion having a base portion and a top portion secured together by a clasp and pivotably connected by a hinge, the top portion having a curved shape rising upward away from the hinge and downward toward the clasp, and the base portion configured to engage a carrying device holding the container, the carrying device hanging from the base portion;
   an arm having a first portion and a second portion, the first portion having a first end connected to the engagement device and a second end connected to the second portion, the first portion being perpendicular to the second portion, and the arm having a length such that the carrying device is suspended and avoids contact with any object inside of the vehicle; and
   a sleeve coupled to the vehicle and configured to receive the second portion of the arm, the second portion of the arm configured to slide into the sleeve and the first portion being outside of the sleeve as the second portion slides into the sleeve.

7. The apparatus of claim 6, wherein the first portion of the arm is straight.

8. The apparatus of claim 6, wherein the first portion of the arm is horizontally oriented and the second portion is vertically oriented.

9. The apparatus of claim 6, wherein the first portion of the arm has a region that is curved upward.

10. The apparatus of claim 6, wherein the engagement device further includes a securing portion configured to cover the hook after the hook engages the carrying device.

11. The apparatus of claim 6, further comprising the carrying device configured to receive the container and having a handle configured to couple to the hook.

12. A vehicle comprising:
   a device or a surface located in an interior cabin;
   a carrying device having a handle and being configured to receive and house a container configured to store a liquid;
   an engagement device having a hook configured to engage the handle of the carrying device, the carrying device hanging from the hook by the handle when the hook engages the carrying device;
   an arm having a first portion and a second portion, the first portion having a first end connected to the engagement device and a second end connected to the second portion, the first portion being perpendicular to the second portion, and the arm having a length such that the carrying device is suspended within the interior cabin, the arm and carrying device structured to prevent spilling of the liquid from the container, and wherein the carrying device avoids contact with any object inside the interior cabin; and
   a sleeve coupled to the device or surface located in the interior cabin, the sleeve configured to receive the second portion of the arm, the second portion of the arm configured to slide into the sleeve and the first portion being outside of the sleeve as the second portion slides into the sleeve.

13. The vehicle of claim 12, wherein the engagement device is configured to engage the carrying device holding the container when the second portion of the arm is slid out of the sleeve.

14. The vehicle of claim 12, wherein the engagement device further includes a securing portion configured to cover the hook after the hook engages the carrying device.

* * * * *